(12) United States Patent
Lehr

(10) Patent No.: US 7,466,221 B1
(45) Date of Patent: Dec. 16, 2008

(54) WARNING SYSTEM FOR CHILD RESTRAINT SYSTEM

(76) Inventor: Scott K. Lehr, 15751 Sheridan St., Apt. #143, Fort Lauderdale, FL (US) 33331-3486

( * ) Notice: Subject to any disclaimer, the term of this patent is extended or adjusted under 35 U.S.C. 154(b) by 295 days.

(21) Appl. No.: 11/557,643

(22) Filed: Nov. 8, 2006

(51) Int. Cl.
*B60Q 1/00* (2006.01)

(52) U.S. Cl. ............... 340/457.1; 340/667; 340/687

(58) Field of Classification Search ............ 340/457.1, 340/457, 687, 686.4, 686.6, 667, 666; 180/271, 180/268
See application file for complete search history.

(56) References Cited

U.S. PATENT DOCUMENTS

| | | | | |
|---|---|---|---|---|
| 5,260,684 A | * | 11/1993 | Metzmaker | ............... 340/457.1 |
| 5,581,234 A | * | 12/1996 | Emery et al. | ............. 340/451.1 |
| 6,230,088 B1 | * | 5/2001 | Husby | .................... 704/45 |
| D450,935 S | | 11/2001 | Dranschak et al. | |
| 6,357,091 B1 | * | 3/2002 | Devereaux | .................... 24/633 |
| 6,809,640 B1 | | 10/2004 | Sherman | |
| 6,853,298 B1 | | 2/2005 | Stojanowski | |
| 6,924,742 B2 | | 8/2005 | Mesina | |
| 2004/0226767 A1 | * | 11/2004 | Martinez et al. | ............. 180/268 |
| 2005/0057350 A1 | | 3/2005 | Younse | |
| 2005/0092539 A1 | * | 5/2005 | Chitalia et al. | ............... 180/271 |
| 2005/0194779 A1 | | 9/2005 | Ito et al. | |
| 2005/0280297 A1 | * | 12/2005 | Patterson et al. | ......... 297/217.4 |
| 2007/0296254 A1 | * | 12/2007 | Kahn | .......................... 340/667 |

* cited by examiner

*Primary Examiner*—Thomas J Mullen

(57) ABSTRACT

This patent discloses a warning system for a child restraint system. The child restraint system may include a base and a seat connected to the base. The seat may include supports for the back, torso, right leg, and left leg and may include sensors to detect the presence of a back, torso, right leg, and left leg, respectively. The seat also may include a right harness strap and a left harness strap that may connect to a child seat buckle and to a chest clip. The seat also may have a locking clip a tether strap having a hook. The seat may contain detectors to determine whether the straps, buckles, clips, and straps are properly connected while a is present in the seat. If not properly connected, an alarm may sound.

12 Claims, 6 Drawing Sheets

WARNING SYSTEM FOR CHILD RESTRAINT SYSTEM

BACKGROUND

1. Field of Endeavor

The information disclosed in this patent relates to electrical communications and more particularly to sensors that may respond to relative conditions between a child, a child car seat, and a vehicle by providing humanly perceptible signals in response to the attainment of predetermined conditions.

2. Background Information

Children receive a staggering amount of damage during an automobile accident. Damage to a child's brain may leads to memory impairment, educational dysfunction, and the loss of the ability to read and write. These force trauma injuries may lead to emotional disturbances such as hyperactivity, apathy, or inattentiveness. Most horrific, a child is much more likely than an adult to die during a car crash.

Early on, child car seats have been designed to mitigate injury to children involved in car crashes. From 1898 to the 1960s, child car seats were designed to restrain a child in place while a vehicle was in motion, but not necessarily keep the child safe from harm. In the 1960s, designers added features to keep a child safe in the event of an accident, such as making the safety seat rear facing and utilizing high impact material. Between the 1970s and 1985, there was a massive push to educate the public on the need of safety seats for young children. By 1985, every state in the U.S. had laws requiring children to ride in a child restraint system.

Accelerating the human body relative to the interior of an automobile is what causes injuries in the crash. Most child car seats utilize a harness to secure the child to the car seat and utilize a seat belt from the automobile to secure the child car seat to the automobile. By securing the child to the automobile interior, the child's body decelerates with the car itself and this ride down during a crash proves a safer deceleration for the child. If the harness or seat belt were to become released while the car is in motion, then the child restraint system would not provide the child any restraint or safety from a car crash.

It is an unfortunate fact that children sometimes release the harness to their safety seat not knowing the horrific dangers they fact. Moreover, the seat belt holding the car seat sometimes is released accidentally and unknowingly by riders sitting in the center back seat next to the seat belt holding the car seat. The potential of this happening may cause anxiety and tension in most parents, not only because of the safety issue but because parents will receive expensive tickets if their child is not properly restrained. To make themselves aware of whether their child is secured, most parents repeatedly turn around while the car is moving to check to see if the children are safely buckled in their seats. A drawback of this is that the parent is not able to concentrate fully on the task of driving.

What is needed is a warning system to better ensure that a child is properly restrained in a child car seat.

SUMMARY

This patent discloses a warning system for a child restraint system. The child restraint system may include a base and a seat connected to the base. The seat may include supports for the back, torso, right leg, and left leg and may include sensors to detect the presence of a back, torso, right leg, and left leg, respectively. The seat also may include a right harness strap and a left harness strap that may connect to a child seat buckle and to a chest clip. The seat also may have a locking clip a tether strap having a hook. The seat may contain detectors to determine whether the straps, buckles, clips, and straps are properly connected while a is present in the seat. If not properly connected, an alarm may sound.

DETAILED DESCRIPTION

Figure 1:
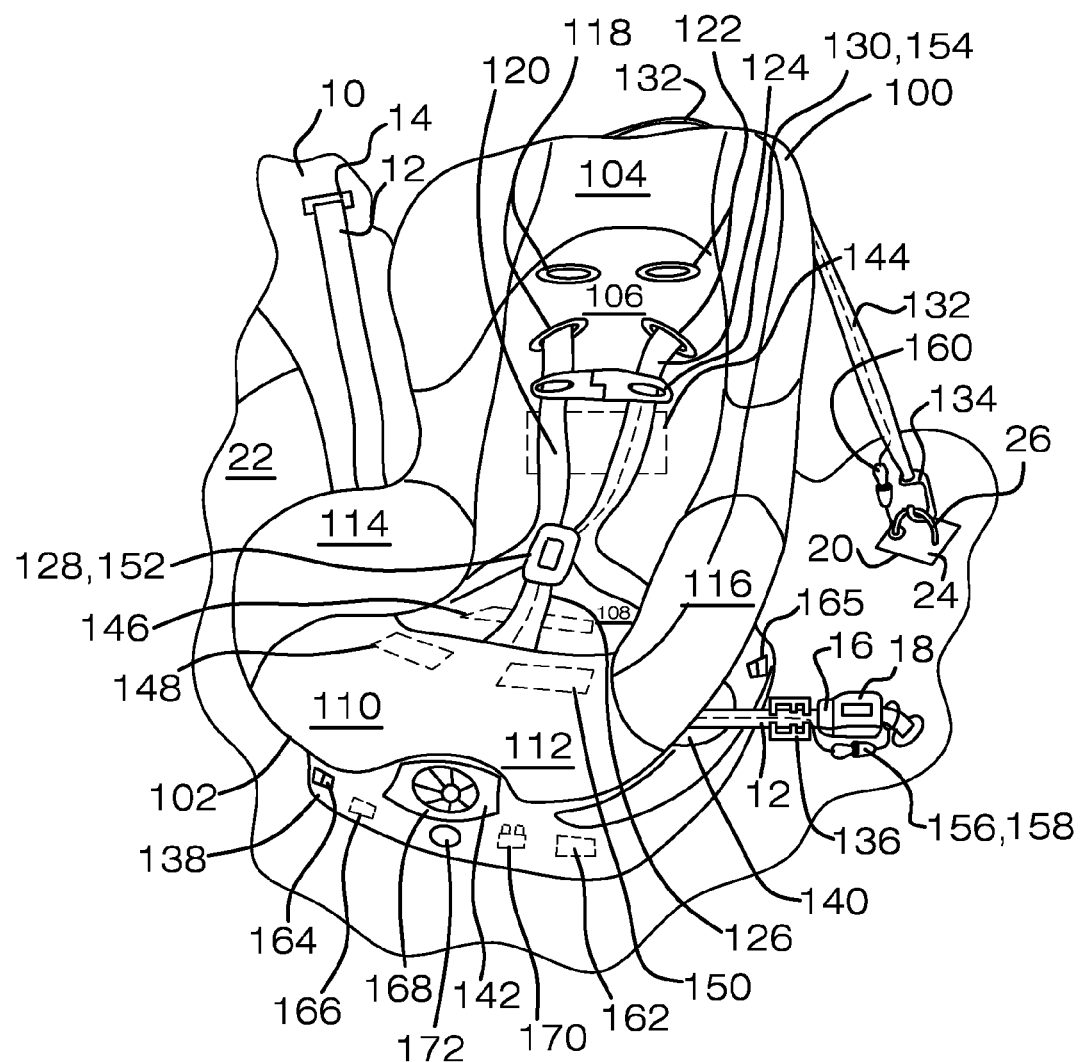
FIG. 1 is an isometric view of a child restraint system 100 in a vehicle 10.

FIG. 1 is an isometric view of a child restraint system 100 in a vehicle 10. Child restraint system 100 may be a restraint system equipped with safety straps to hold a child in a seated position in vehicle 10. As set out in more detail below, child restraint system 100 may include sensors that may respond to relative conditions between a child, child restraint system 100, and vehicle 10 by providing humanly perceptible signals in response to the attainment of predetermined conditions.

Vehicle 10 may include a lap/shoulder belt 12 extending from a back seat retractor 14 and having a lap/shoulder belt buckle tongue 16 configured to mate to a vehicle seat belt buckle 18 secured to vehicle 10. Vehicle 10 additionally may include a latch anchor 20 and door 22. Latch anchor 20 may have a metal plate 24 attached to vehicle 10 and latch anchor ring 26 attached to metal plate 24. Generally, lap/shoulder belt 12 and latch anchor 20 may aid in securing child restraint system 100 to vehicle 10.

Child restraint system 100 may include a seat 102. Seat 102 may have components attached to form an area contoured to support a body by the back, buttocks, and thighs and provide resting areas for the arms of the body. For example, seat 102 may include a head support 104, a back support 106, a torso support 108, a right leg support 110, a left leg support 112, a right arm support 114, and a left arm support 116. Each may function as their name describes. For example, head support 104 may support a child's head, back support 106 may support a child's back, and left leg support 112 may support a child's left leg.

Head support 104 may be attached to back support 106. Back support 106 may be attached to torso support 108 and torso support 108 may be attached to both right leg support 110 and left leg support 112. Right arm support 114 may be attached to head support 104, back support 106, torso support 108, and right leg support 110. Left arm support 116 may be attached to head support 104, back support 106, torso support 108, and left leg support 112.

Seat 102 additionally may include right slots 118, a right harness strap 120, left slots 122, a left harness strap 124, a crotch strap 126, a child seat buckle 128, a chest clip 130, a tether strap 132 having a hook 134, and a locking clip 136. Right slots 118 may provide a method to adjust a length of right harness strap 120 and left slots 122 may provide a method to adjust a length of left harness strap 124. Right harness strap 120 and left harness strap each may be attached to seat 102 and removeably secured into child seat buckle 128. Child seat buckle 128 may be attached to crotch strap 126, which, in turn may be attached to seat 102. Chest clip 130 may removeably secure right harness strap 120 and left harness strap 124 to each other. Tether strap 132 may be attached near head support 104 and hook 134 of tether strap 132 may be attached to latch anchor 20 to secure child restraint system 100 to vehicle 10.

Child restraint system 100 additionally may include a base 138. Base 138 may be a pedestal upon which seat 102 may be secured. Base 138 may include a belt passageway 140 and a base hole 142. Lap/shoulder belt buckle tongue 16 and lap/shoulder belt 12 may be passed from back seat retractor 14 through belt passageway 140 and secured to vehicle seat belt buckle 18 to secure child restraint system 100 to vehicle 10. In those situations where lap/shoulder belt buckle tongue 16 slides freely along lap/shoulder belt 12 without locking into place, locking clip 136 may be threaded onto lap/shoulder belt 12 and slid to a position that is within about one-half an inch of vehicle seat belt buckle 18.

Child restraint system 100 may include sensors to determine the presence of a child in seat 102, determine whether a child is sitting correctly in seat 102, determine whether any one of right harness strap 120, left harness strap 124, chest clip 130, tether strap 132, lap/shoulder belt 12, and locking clip 136 are properly secured. In particular, child restraint system 100 may include a back sensor 144 positioned in back support 106, a torso sensor 146 positioned in torso support 108, a right leg sensor 148 positioned in right leg support 110, and a left leg sensor 150 positioned in left leg support 112. Each sensor 144, 146, 148, and 150 may indicate a presence of an associated body part by detecting a force applied by that body part due to the weigh of that body part. For example, back support 106 may detect that a child is leaning against seat 102 and right leg sensor 148 may detect a weight of a child's right leg as that leg dangles over right leg support 108.

In addition to sensors 144, 146, 148, and 150, child restraint system 100 may include a child seat buckle detector 152, a chest clip detector 154, a vehicle seat belt buckle detector 156, a locking clip detector 158, a latch anchor detector 160, an acceleration detector 162, first movement detector 164, a second movement detector 165, a controller 166, a speaker 168, a power source 170, and a data input/output port 172. Importantly, sensors 144, 146, 148, and 150, detectors 152, 154, 156, 158, 160, 162, 164, 165, controller 166, speaker 168, and power source 170 all may be contained within child restraint system 100. Under such an arrangement, a consumer need only purchase and install child restraint system 100 without modifying vehicle 10.

Figure 2:
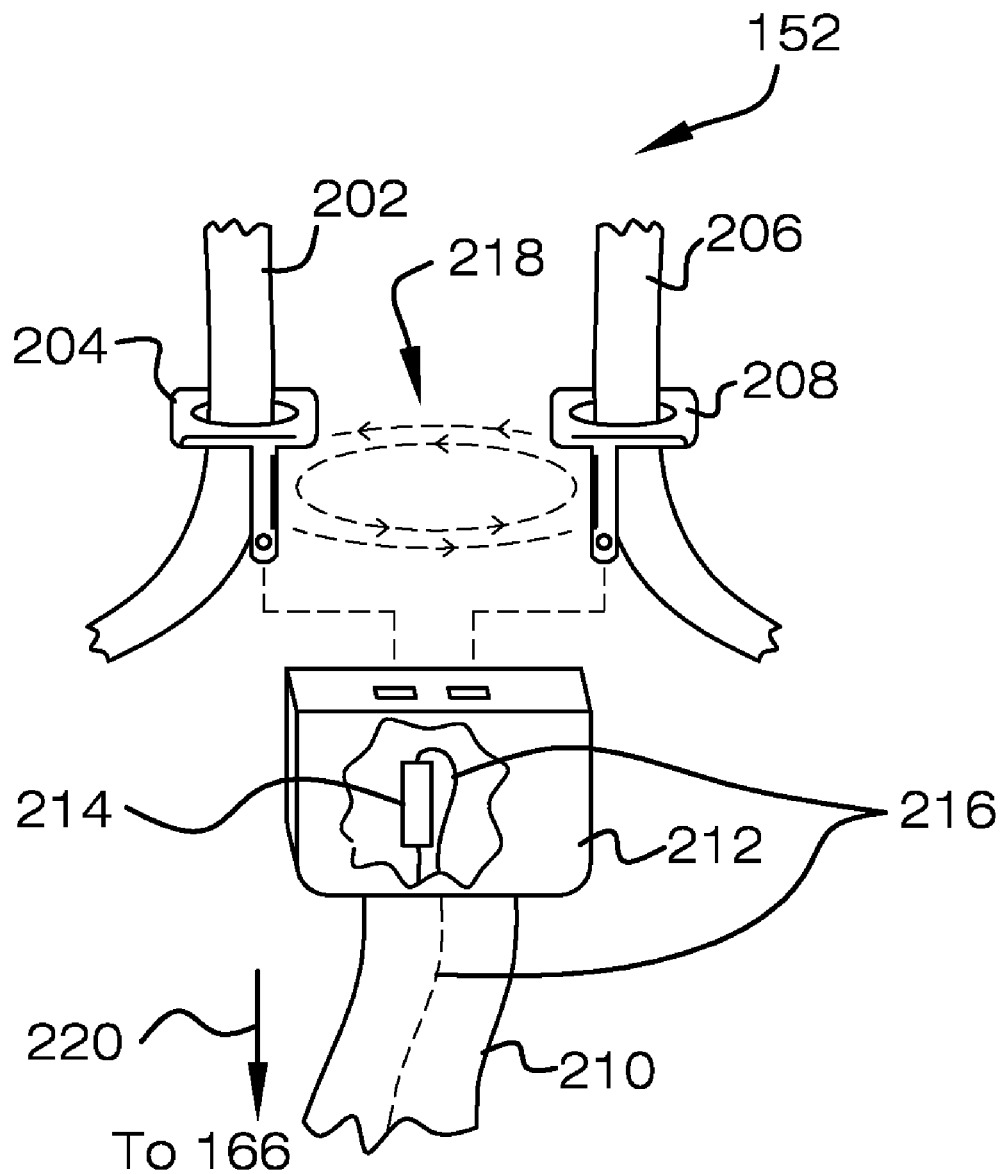
FIG. 2 is an isometric view of child seat buckle detector 152.

FIG. 2 is an isometric view of child seat buckle detector 152. Included with child seat buckle detector 152 may be a right harness strap 202 having a right buckle tongue 204 and a left harness strap 206 having a left buckle tongue 208. Child seat buckle detector 152 additionally may include a crotch strap 210 attached to a child seat buckle 212 and include a buckle tongue detector 214 attached to wires 216. Wires 216 may be configured to bring power to buckle tongue detector 214 and may be integrated into crotch strap 210 and passed to controller 166.

Both right buckle tongue 204 and left buckle tongue 208 may be configure to fit within child seat buckle 212 and be secured in a position that may be fixed relative to buckle tongue detector 214. When right buckle tongue 204 and left buckle tongue 208 are in this fixed position, child seat buckle 212 may be deemed to be properly secured.

Both right buckle tongue 204 and left buckle tongue 208 may include material arranged to set up a magnetic field 218 between right buckle tongue 204 and left buckle tongue 208 when these two elements are within a predetermined distance from each other. Buckle tongue detector 214 may be positioned in this magnetic field 218 when right buckle tongue 204 and left buckle tongue 208 fixed in position relative to buckle tongue detector 214.

If either right buckle tongue 204 or left buckle tongue 208 are moved relative to one another, that may indicated that child seat buckle 212 is not properly secured. Here, if either right buckle tongue 204 or left buckle tongue 208 are moved relative to one another, magnetic field 218 may change and that change may be picked up by buckle tongue detector 214. As a result of this change, buckle tongue detector 214 may generate a buckle tongue signal 220 and send buckle tongue signal 220 along wires 216.

Buckle tongue signal 220 may be a first buckle tongue signal to signal a modification to an existing magnetic field 218 and may be a second buckle tongue signal to signal a nonexisting magnetic field 218. To signal a modification to an existing magnetic field 218, at least one of right buckle tongue 204 and left buckle tongue 208 should be properly secured to child seat buckle 212 and the remaining buckle tongue should be close enough to the properly secured buckle tongue to generate a magnetic field between right buckle tongue 204 and left buckle tongue 208.

Chest clip detector 154 may have a configuration similar to child seat buckle detector 152 of FIG. 2. Opposing chest clip buckle tongues may include material arranged to set up a magnetic field between the opposing chest clip buckle tongues when these two elements are within a predetermined distance from each other. A chest clip buckle detector may be positioned in the magnetic field to pick up any relative movement between the opposing chest clip buckle tongues. Relative movement between the opposing chest clip buckle tongues may indicated that chest clip 130 may not be properly installed and a signal may be generated and send to controller 166.

Figure 3:
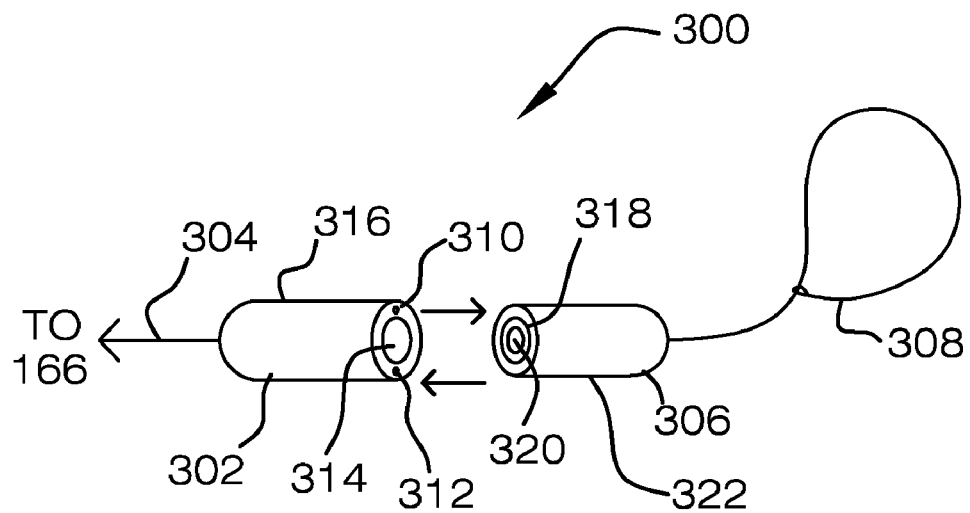
FIG. 3 is an isometric view of an external detector 300.

FIG. 3 is an isometric view of an external detector 300. External detector 300 may be utilized to detect attachments between child restraint system 100 and vehicle 10. Both vehicle seat belt buckle detector 156 and latch anchor detector 160 may employ and external detector 300. Locking clip detector 158 may be attached to an external detector 300 utilized for vehicle seat belt buckle detector 156 and thus employ an external detector 300.

External detector 300 may include a male piece 302 connected to wires 304 and a female piece 306 connected to a lanyard 308. Male piece 302 may include a first bus 310 and a third bus 312 sandwiched between a male piece magnet 314 and a male housing 316. First bus 310 and third bus 312 may be connected to wires 304. Wires 304 may lead to controller 166.

Female piece 306 may include a second bus 318 sandwiched between a female piece magnet 320 and a female housing 322. Second bus 318 may be a disk. When first bus 310 and third bus 312 are in contact with second bus 318, a circuit may be completed. Male piece magnet 314 and female piece magnet 320 may hold together male piece 302 and female piece 306 and, in doing so, complete the bus 310, 312, 318 circuit. Completing the bus 310, 312, 318 circuit may generate an external detector signal that may be transmitted to controller 166 via wires 304.

A lanyard 308 may be secured around latch anchor ring 26 (see FIG. 1) as part of latch anchor detector 160. Should hook 134 of tether strap 132 become separated from latch anchor 20, male piece magnet 314 may separate from female piece magnet 320. Separating male piece magnet 314 and female piece magnet 320 may break the bus 310, 312, 318 circuit and may generate an external detector warning signal in controller 166.

For vehicle seat belt buckle detector 156, a lanyard 308 may be secured around vehicle seat belt buckle 18 (see FIG. 1) as part of vehicle seat belt buckle detector 156. Should lap/shoulder belt buckle tongue 16 become separated from vehicle seat belt buckle 18, male piece magnet 314 may separate from female piece magnet 320. The bus 310, 312, 318 circuit may be interrupted and an external detector warning signal may be generate in controller 166.

As noted above, locking clip 136 may be threaded onto lap/shoulder belt 12 and slid to a position that is within about one-half an inch of vehicle seat belt buckle 18. Wires 304 of external detector 300 may be attached to locking clip 136 as locking clip 136 may be positioned within about one-half an inch of vehicle seat belt buckle 18. If locking clip 136 moves outside of this one-half an inch from vehicle seat belt buckle 18 position, male piece magnet 314 may separate from female piece magnet 320 and an external detector warning signal may be generate in controller 166.

Figure 4:
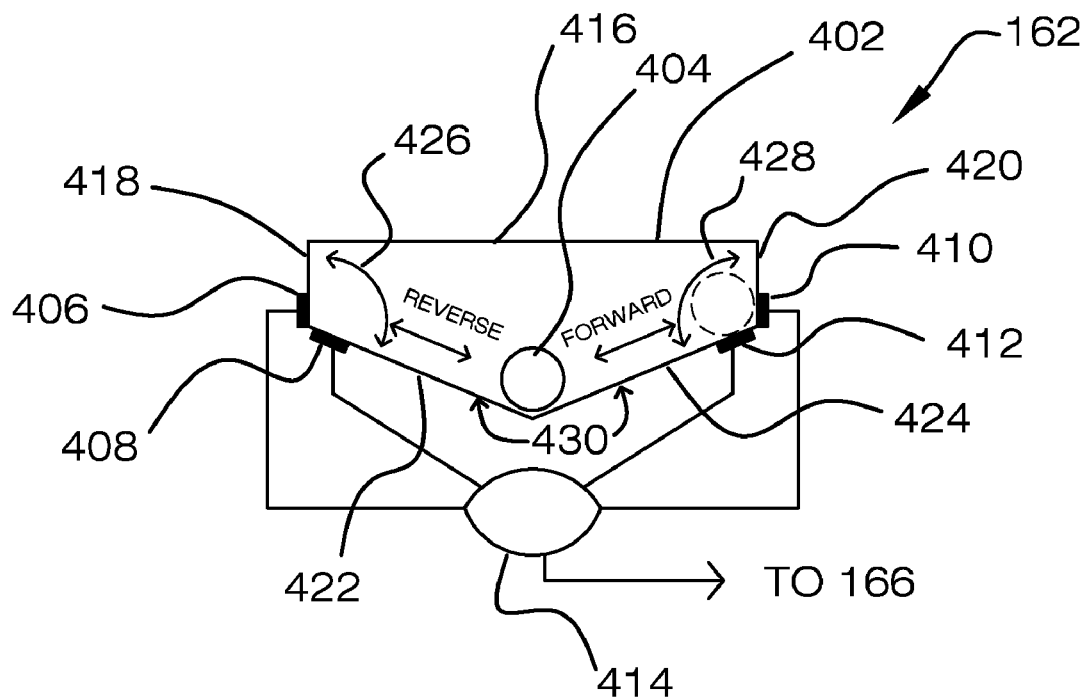
FIG. 4 is a side schematic view of acceleration detector 162.

FIG. 4 is a side schematic view of acceleration detector 162. After the engine of vehicle 10 is started, a next step may be for vehicle 10 to accelerate forward or backward from a parked position. As note in more detail below, child restraint system 100 may utilize this first instance of acceleration after engine start to make warning determinations.

Acceleration detector 162 may include an acceleration detector housing 402, a roller 404, a first contact 406, a second contact 408, a third contact 410, a fourth contact 412, an acceleration detector circuit detector 414, and wires connected between acceleration detector circuit detector 414 and contacts 406, 408, 410, and 412.

Acceleration detector housing 402 may have a top 416, a first side 418, a second side 420, a first bottom 422, and a second bottom 424. First side 418 and second side 420 may be connected to top 416 at a ninety degree angle. First bottom 422 may be connected to first side 418 at an obtuse angle 426 and second bottom 424 may be connected to second side 420 at an obtuse angle 428 that may equal obtuse angle 426. First bottom 422 and second bottom 424 may be connected to each other at an obtuse angle 430.

Roller 404 may be metallic and may be cylindrical, spherical, or any other shape that may roll. Should vehicle 10 accelerate in reverse, roller 404 may move up first bottom 422 to contact both first contact 406 and a second contact 408 to complete a circuit. Acceleration detector circuit detector 414 may sense this completed circuit and send a signal to controller 166. Should vehicle 10 accelerate forward, roller 404 may move up second bottom 424 to contact both third contact 410 and fourth contact 412 to complete a circuit. Acceleration detector circuit detector 414 may sense this completed circuit and send a signal to controller 166. When vehicle 10 is not accelerating, roller 404 may be remote from contacts 406, 408, 410, and 412.

As noted above, child restraint system 100 may include first movement detector 164 and second movement detector 165. First movement detector 164 and second movement detector 165 may be positioned in a corner of base 138 (FIG. 1). Each of first movement detector 164 and second movement detector may be optical detectors in that that may send out a light signal that may bounce off an object in vehicle 10 and return to the respective detector. Should a distance traveled by this light signal change, that may generate a warning signal.

First movement detector 164 and second movement detector 165 may be thought of as backup warning systems. Should child restraint system 100 not be secure while vehicle 10 is in motion and should child seat buckle detector 152, chest clip detector 154, vehicle seat belt buckle detector 156, or locking clip detector 158 fail, seat 102 and base 138 may move. This movement of seat 102 and base 138 may be detected by first movement detector 164 and/or second movement detector 165 and a warning signal may be generated.

Controller 166 (FIG. 1) may include a microprocessor that may receive, process, and generate signals. Controller 166 may adjust the settings of the other electrical components of child restraint system 100. Speaker 168 may be electroacoustic transducer that may convert electrical signals into sounds loud enough to be heard at a distance.

Power source 170 (FIG. 1) may be a battery that may travel with child restraint system 100. Data input/output port 172 may receive signals from a local or remote control to adjust the settings of the other electrical components of child restraint system 100. For example, the force settings for back sensor 144, torso sensor 146, right leg sensor 148, and left leg sensor 150 may be different for a five year old child and a one year old child. These settings may be adjusted through data input/output port 172.

Figure 5:
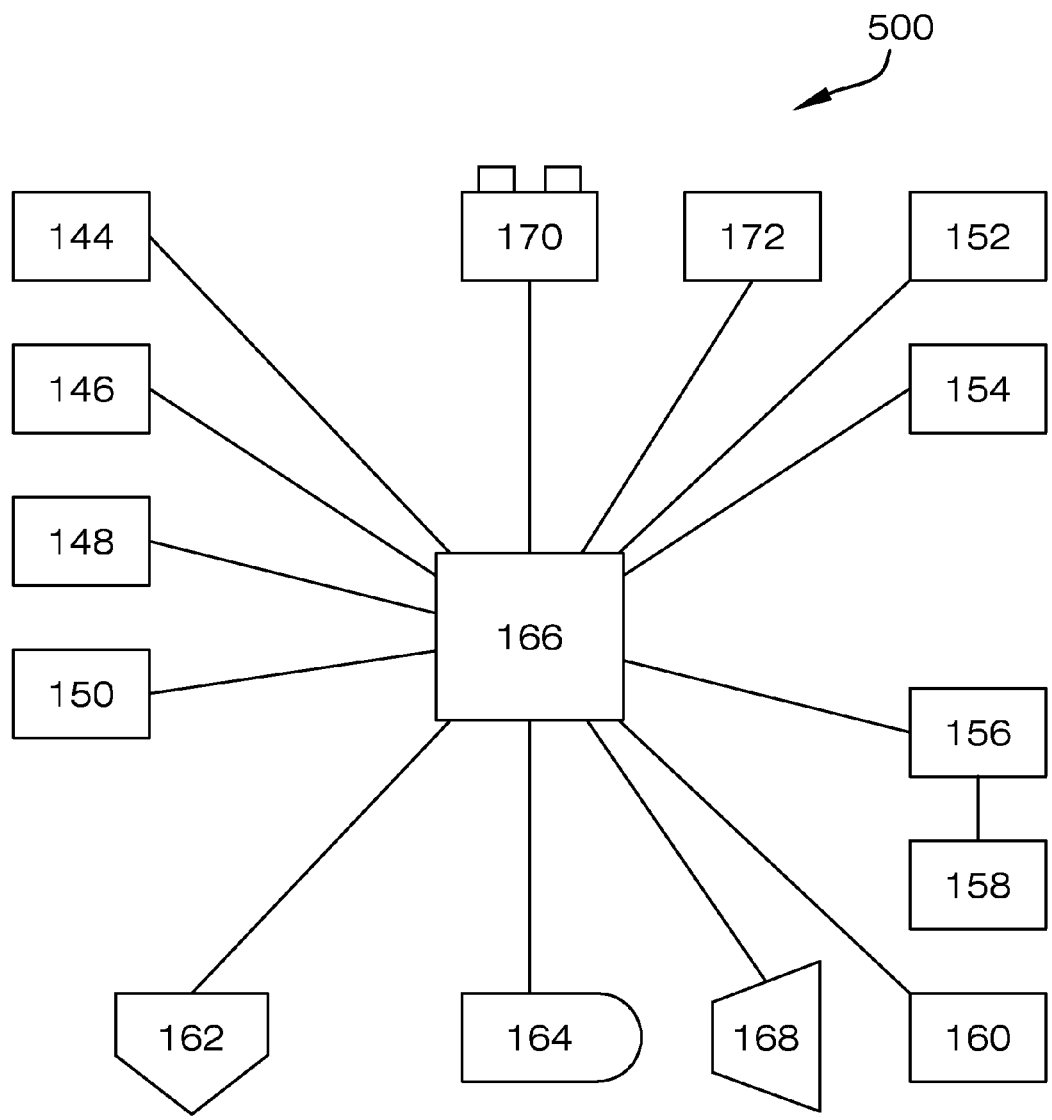
FIG. 5 is a schematic 500 of electrical connections between controller 166 and other components of child restraint system 100.

FIG. 5 is a schematic 500 of electrical connections between controller 166 and other components of child restraint system 100. Each element may be in communication with controller 166 and with each other such as through controller 166.

Figure 6:
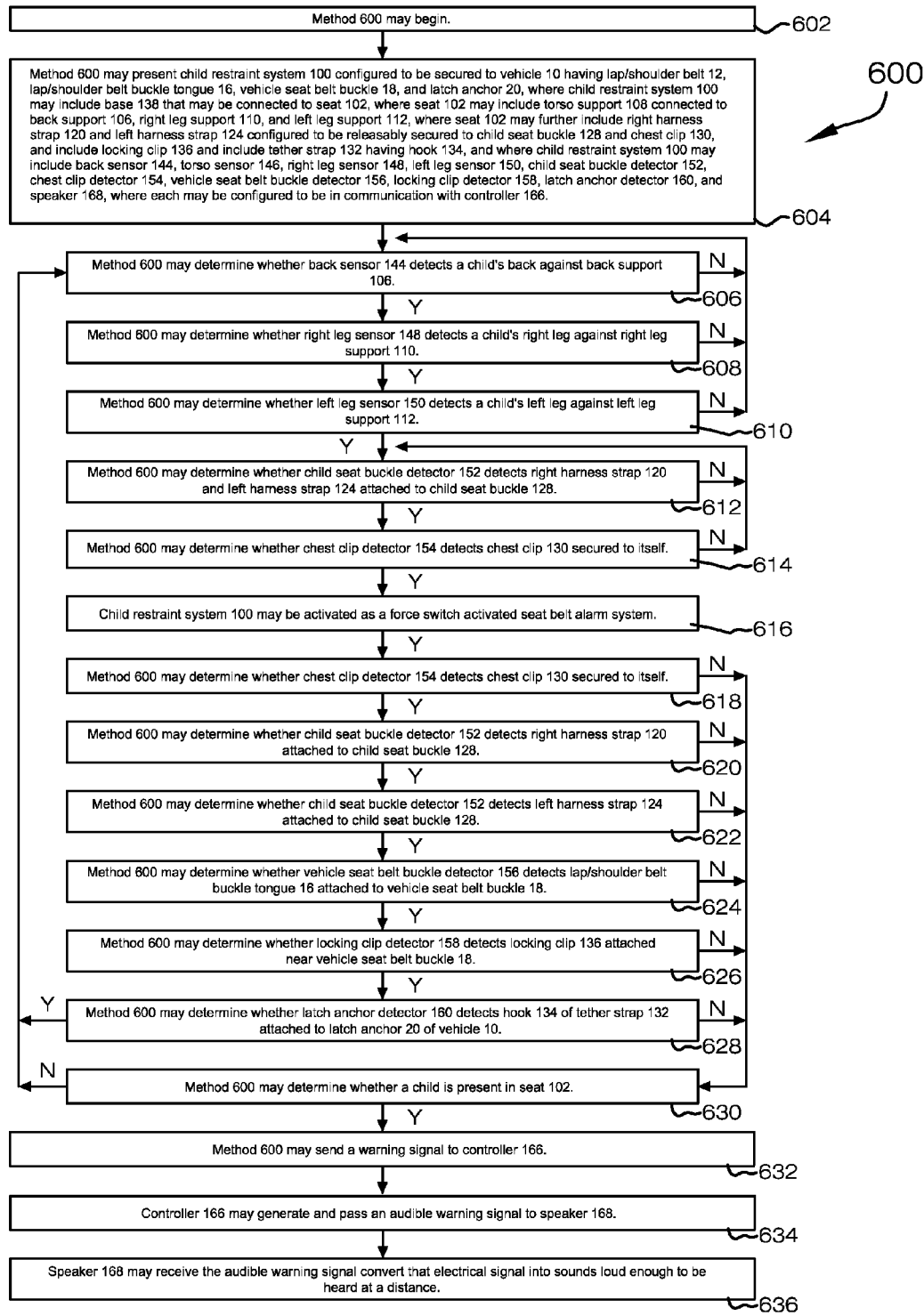
FIG. 6 is a method 600 to generate warnings for a child restraint system 100.

FIG. 6 is a method 600 to generate warnings for a child restraint system 100. At step 602, method 600 may begin. At step 604, method 600 may present child restraint system 100 configured to be secured to vehicle 10 having lap/shoulder belt 12, lap/shoulder belt buckle tongue 16, vehicle seat belt buckle 18, and latch anchor 20, where child restraint system 100 may include base 138 that may be connected to seat 102, where seat 102 may include torso support 108 connected to back support 106, right leg support 110, and left leg support 112, where seat 102 may further include right harness strap 120 and left harness strap 124 configured to be releasably secured to child seat buckle 128 and chest clip 130, and include locking clip 136 and include tether strap 132 having hook 134, and where child restraint system 100 may include back sensor 144, torso sensor 146, right leg sensor 148, left leg sensor 150, child seat buckle detector 152, chest clip detector 154, vehicle seat belt buckle detector 156, locking clip detector 158, latch anchor detector 160, and speaker 168, where each may be configured to be in communication with controller 166.

In the next steps, method 600 may activate child restraint system 100 if two conditions may be met: (i) child restraint system 100 detects a child present in seat 102 and detects (ii)(a) right harness strap 120 and left harness strap 124 attached to child seat buckle 128 and (ii)(b) chest clip 130 secured to itself. A child sitting in seat 102 may not necessarily be properly restrained even if their torso is being supported by torso support 108. However, a child properly restrained in seat 102 may have their back against back support 106 (FIG. 1), have their right leg against right leg support 110, and have their left leg against left leg support 112.

At step 606, method 600 may determine whether back sensor 144 detects a child's back against back support 106. If yes, then method 600 may proceed to step 608; otherwise, method 600 may return to step 606. At step 608, method 600 may determine whether right leg sensor 148 detects a child's right leg against right leg support 110. If yes, then method 600 may proceed to step 610; otherwise, method 600 may return to step 606. At step 610, method 600 may determine whether left leg sensor 150 detects a child's left leg against left leg support 112. If yes, then method 600 may proceed to step 612; otherwise, method 600 may return to step 606.

At step 612, method 600 may determine whether child seat buckle detector 152 detects right harness strap 120 and left harness strap 124 attached to child seat buckle 128. If yes, then method 600 may proceed to step 614; otherwise, method 600 may return to step 612. At step 614, method 600 may determine whether chest clip detector 154 detects chest clip 130 secured to itself. If yes, then method 600 may proceed to step 616; otherwise, method 600 may return to step 612.

At step 616, child restraint system 100 may be activated as a force switch activated seat belt alarm system. A light bulb on base 138 may light to indicate that the child restraint system 100 may be activated. There may be an on/off switch on base 138 that may prevent or permit activation of child restraint system 100.

At step 618, method 600 may determine whether chest clip detector 154 detects chest clip 130 secured to itself. If yes, then method 600 may proceed to step 620. If no, method 600 may proceed to step 630.

At step 620, method 600 may determine whether child seat buckle detector 152 detects right harness strap 120 attached to child seat buckle 128. If yes, then method 600 may proceed to step 622. If no, method 600 may proceed to step 630.

At step 622, method 600 may determine whether child seat buckle detector 152 detects left harness strap 124 attached to child seat buckle 128. If yes, then method 600 may proceed to step 624. If no, method 600 may proceed to step 630.

At step 624, method 600 may determine whether vehicle seat belt buckle detector 156 detects lap/shoulder belt buckle tongue 16 attached to vehicle seat belt buckle 18. If yes, then method 600 may proceed to step 626. If no, method 600 may proceed to step 630.

At step 626, method 600 may determine whether locking clip detector 158 detects locking clip 136 attached near vehicle seat belt buckle 18. If yes, then method 600 may proceed to step 628. If no, method 600 may proceed to step 630.

At step 628, method 600 may determine whether latch anchor detector 160 detects hook 134 of tether strap 132 attached to latch anchor 20 of vehicle 10. If yes, then method 600 may return to step 606. If no, method 600 may proceed to step 630.

At step 630, method 600 may determine whether a child is present in seat 102. If method 600 has reached this step, then a child was initially in seat 102 and was properly secured to seat 102 and at least one of the sensors may indicate that the child is no longer properly secured to seat 102 or that seat 102 is not properly secured to automobile 10. If the child still is present in seat 102, then an alarm may sound to alert the driver that the child may not be secure. A quick, go-no go test to determine the presence of a child in seat 102 may be appropriate here. Method 600 may determine whether a child is present in seat 102 by determining whether torso sensor 146 detects a torso in torso support 108.

If method 600 determines that a child is not present in seat 102 at step 630, then method 600 may return to step 606. If method 600 determines that a child is present in seat 102 at step 630, then method 600 may send a warning signal to controller 166 at step 632. At step 634, controller 166 may generate and pass an audible warning signal to speaker 168. There may be a different audible warning signal for each detector. For example, there may be a unique audible warning signal for chest clip detector 154, child seat buckle detector 152, vehicle seat belt buckle detector 156, locking clip detector 158, and latch anchor detector 160. In another example, there may be five unique audible warning signals that may be generated by controller 166.

At step 636, speaker 168 may receive the audible warning signal convert that electrical signal into sounds loud enough to be heard at a distance. This sound may provide a warning to a driver of vehicle 10 that their child may be improperly secured.

Figure 7:
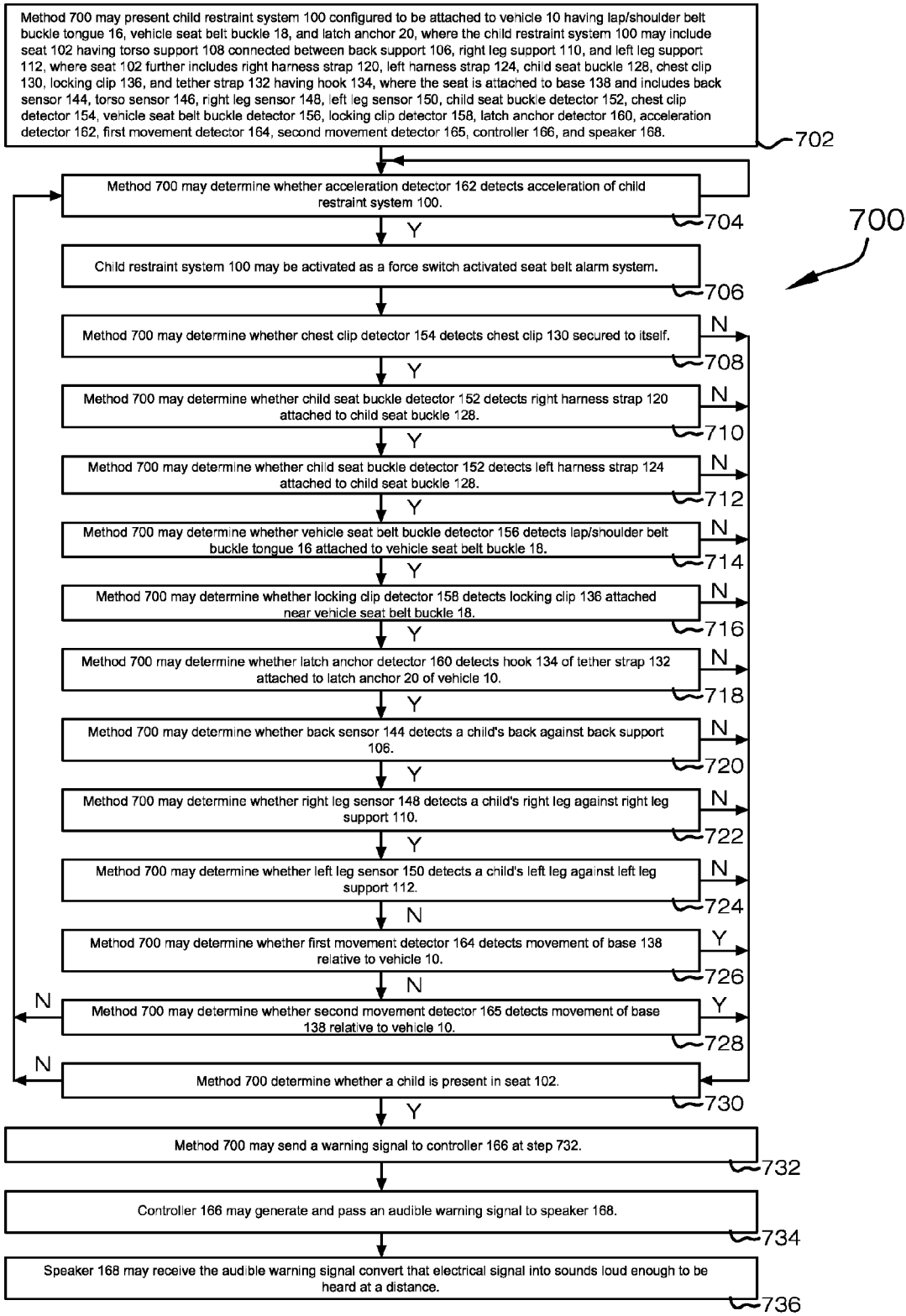
FIG. 7 is a method 700 to generate warnings for a child restraint system 100.

FIG. 7 is a method 700 to generate warnings for a child restraint system 100. At 702, method 700 may present child restraint system 100 configured to be attached to vehicle 10 having lap/shoulder belt buckle tongue 16, vehicle seat belt buckle 18, and latch anchor 20, where the child restraint system 100 may include seat 102 having torso support 108 connected between back support 106, right leg support 110, and left leg support 112, where seat 102 further includes right harness strap 120, left harness strap 124, child seat buckle 128, chest clip 130, locking clip 136, and tether strap 132 having hook 134, where the seat is attached to base 138 and includes back sensor 144, torso sensor 146, right leg sensor 148, left leg sensor 150, child seat buckle detector 152, chest clip detector 154, vehicle seat belt buckle detector 156, locking clip detector 158, latch anchor detector 160, acceleration detector 162, first movement detector 164, second movement detector 165, controller 166, and speaker 168.

At 704, method 700 may determine whether acceleration detector 162 detects acceleration of child restraint system 100. Acceleration detector 162 may be positioned in child restraint system 100 and if a roller within acceleration detector 162 touches two contacts to complete a circuit, then acceleration detector 162 determine that child restraint system 100 is accelerating. If acceleration detector 162 detects acceleration of child restraint system 100, then child restraint system 100 may be activated as a force switch activated seat belt alarm system at step 706. If acceleration detector 162 does not detect acceleration of child restraint system 100, then method 700 may return to step 704.

At step 708, method 700 may determine whether chest clip detector 154 detects chest clip 130 secured to itself. If yes, then method 700 may proceed to step 710. If no, method 700 may proceed to step 730.

At step 710, method 700 may determine whether child seat buckle detector 152 detects right harness strap 120 attached to child seat buckle 128. If yes, then method 700 may proceed to step 712. If no, method 700 may proceed to step 730.

At step 712, method 700 may determine whether child seat buckle detector 152 detects left harness strap 124 attached to child seat buckle 128. If yes, then method 700 may proceed to step 714. If no, method 700 may proceed to step 730.

At step 714, method 700 may determine whether vehicle seat belt buckle detector 156 detects lap/shoulder belt buckle tongue 16 attached to vehicle seat belt buckle 18. If yes, then method 700 may proceed to step 716. If no, method 700 may proceed to step 730.

At step 716, method 700 may determine whether locking clip detector 158 detects locking clip 136 attached near vehicle seat belt buckle 18. If yes, then method 700 may proceed to step 718. If no, method 700 may proceed to step 730.

At step 718, method 700 may determine whether latch anchor detector 160 detects hook 134 of tether strap 132 attached to latch anchor 20 of vehicle 10. If yes, then method 700 may proceed to step 720. If no, method 700 may proceed to step 730.

At step 720, method 700 may determine whether back sensor 144 detects a child's back against back support 106. If yes, then method 700 may proceed to step 722. If no, method 700 may proceed to step 730.

At step 722, method 700 may determine whether right leg sensor 148 detects a child's right leg against right leg support 110. If yes, then method 700 may proceed to step 724. If no, method 700 may proceed to step 730.

At step 724, method 700 may determine whether left leg sensor 150 detects a child's left leg against left leg support 112. If yes, then method 700 may proceed to step 726. If no, method 700 may proceed to step 730.

At step 726, method 700 may determine whether first movement detector 164 detects movement of base 138 relative to vehicle 10. If no, then method 700 may proceed to step 728. If yes, method 700 may proceed to step 730.

At step 728, method 700 may determine whether second movement detector 165 detects movement of base 138 relative to vehicle 10. If no, then method 700 may return to step 704. If yes, method 700 may proceed to step 730.

At step 730, method 700 determine whether a child is present in seat 102. If method 700 has reached this step, then vehicle 10 has just accelerated and at least one of the sensors may indicate that child restraint system 100 may not be properly securing a child. If a child is present in seat 102, then a warning should sound. A quick, go-no go test to determine the presence of a child in seat 102 may be appropriate here. For example, method 700 may determine whether a child is present in seat 102 by determining whether torso sensor 146 detects a torso in torso support 108.

If method 700 determines that a child is not present in seat 102, then method 700 may return to step 704 to await the next acceleration to repeat the safety check. If method 700 determines that a child is present in seat 102, then method 700 may send a warning signal to controller 166 at step 732.

At step 734, controller 166 may generate and pass an audible warning signal to speaker 168. There may be a different audible warning signal for each detector. For example, there may be a unique audible warning signal for chest clip detector 154, child seat buckle detector 152, vehicle seat belt buckle detector 156, locking clip detector 158, and latch anchor detector 160. In another example, there may be five unique audible warning signals that may be generated by controller 166.

At step 736, speaker 168 may receive the audible warning signal convert that electrical signal into sounds loud enough to be heard at a distance. This sound may provide a warning to a driver of vehicle 10 that their child may be improperly secured.

The child restraint system may be child car seat that may include an alarm for the child's harness/restraint buckle, as well as for the attachment point for the vehicle seat belt (or the LATCH attachments). The alarms may notify the driver if the child was not secured properly.

Specifically, the child restraint system may include a force switch/sensor in the base of the seat that may be capable of determining when a child was in the seat. A sensor on the harness or the harness buckle may detect when it was secured. If a child was in the seat and the buckle was released, a loud alarm/alert noise may sound to notify the driver. A similar sensor may determine when the seat belt or LATCH attachments were in place, and may notify the driver if the car seat was not properly secured. The child restraint system sensor system may be incorporated into standard baby/toddler seats as well as booster seats. The seat belt or LATCH sensors also may be directly incorporated as safety features in new vehicles.

Use of the child restraint system may reduce parental anxiety and tension, as well as eliminate the need to turn around to check (while traveling) to see if the children are safely buckled in their seats. Ultimately, this device may save lives by allowing the safety harness to restrain the youngster in the event of an accident.

The child restraint system may be a stand alone car child safety seat. This seat may be designed in a way that it's portable and may be moved form car to car with ease. The child restraint system may be designed to inform the driver of the car when the seat belt from the car seat may be removed by sounding a loud audio alarm. This system generally is not intergraded into the vehicle thus being portable. The car seat may include a second alarm that may be attached the seat belt of the car, which also may alert the driver if this belt is disconnected as well uncaring the car seat from the car.

The child restraint system may include a two fold operation. Unlike other car seats, the child restraint system may be equipped with a force switch activated seat belt alarm system that may be activated when a child may be present in the car seat and the seat belt buckle of the car seat may be clipped together. If for any reason the car seat belt may be disconnected while a child may be present in the seat the alarm will sound alerting the driver that the belt may be no longer secure. If for any reason the car seat belt may be detached, an alarm as well advises the drive that the car seat may be not longer secure attached to the vehicle.

The entire child restraint system may be integrated into a portable car seat and includes several features. As part of the seat, there may be a force switch that may detect when a child may be present and then may activate the system. On the right side of the car seat there may be a speaker that may generate a loud alarm. The restraint system in the buckle has a sensor that may activate when the buckle may be connected. When the buckle is disconnected and a child is present in the seat, an alarm may sound advising the driver that the child restraints have been disconnected.

The child restraint system may fulfill the need for a modified child car seat that may include a warning system for ensuring the child was properly restrained in the seat.

The appealing features of child restraint system include its increased safety for children and peace of mind for parents. If the seat or the child is not properly restrained in the vehicle, the child restraint system may provide a warning system that may allow parents/caregivers to correct the problem before the child was put at risk. Instead of being completely unaware if a child has released the safety harness in an attempt to get out of the seat, this system may alert the driver when the car seat harness has been unbuckled while the vehicle may be in motion. This may allow the driver to verify the security of children in the back seat without turning around. A parent may be able to concentrate on the task of driving while still receiving immediate warning if a child tried to free himself. Immediate action may then be taken to safely restrain the child.

Use of the child restraint system may help parents avoid expensive tickets in states where seat belt/restraint usage may be mandatory. Ultimately, this system may save lives by helping to ensure that children were properly restrained in the event of an accident. A car seat may be a necessity item for new parents, and the child restraint system may be an excellent choice because of its safety features.

The information disclosed herein is provided merely to illustrate principles and should not be construed as limiting the scope of the subject matter of the terms of the claims. The written specification and figures are, accordingly, to be regarded in an illustrative rather than a restrictive sense.

Moreover, the principles disclosed may be applied to achieve the advantages described herein and to achieve other advantages or to satisfy other objectives, as well.

What is claimed is:

1. A method to generate warnings for a child restraint system, the method comprising:
   (i) presenting a child restraint system configured to be secured to a vehicle having a lap/shoulder belt, a lap/shoulder belt buckle tongue, a vehicle seat belt buckle, and a latch anchor, where the child restraint system includes a base that is connected to a seat, where the seat includes a torso support connected to a back support, a right leg support, and a left leg support, where the seat further includes a right harness strap and a left harness strap configured to be releasably secured to a child seat buckle and a chest clip, and where the seat further includes a locking clip and a tether strap having a hook, and where the child restraint system includes a back sensor, a torso sensor, a right leg sensor, a left leg sensor, a child seat buckle detector, a chest clip detector, a vehicle seat belt buckle detector, a locking clip detector, a latch anchor detector, and a speaker, where each is configured to be in communication with a controller;
   (ii) determining whether the back sensor detects a child's back against the back support and if the back sensor does not detect a child's back against the back support, then returning to step (ii);
   (iii) if the back sensor does detect a child's back against the back support, then determining whether the right leg sensor detects a child's right leg against the right leg support and if the right leg sensor does not detect a child's right leg against the right leg support, then returning to step (ii);
   (iv) if the right leg sensor does detect a child's right leg against the right leg support, then determining whether the left leg sensor detects a child's left leg against the left leg support and if the left leg sensor does not detect a child's left leg against the left leg support then returning to step (ii);
   (v) if the left leg sensor does detect a child's left leg against the left leg support then determining whether the child seat buckle detector detects the right harness strap and the left harness strap attached to child seat buckle and if the child seat buckle detector does not detect the right harness strap and the left harness strap attached to child seat buckle then returning to step (v);
   (vi) if the child seat buckle detector does detect the right harness strap and the left harness strap attached to child seat buckle, then determining whether the chest clip detector detects the chest clip secured to itself and if the chest clip detector does not detect the chest clip secured to itself then returning to step (v); and
   (vii) if the chest clip detector does detect the chest clip secured to itself, then activating the child restraint system.

2. The method of claim 1, further comprising:
   (viii) determining whether the chest clip detector detects the chest clip secured to itself;
   (ix) if the chest clip detector does not detect the chest clip secured to itself, then determining whether a child is present in the seat; and
   (x) if a child is determined to be present in the seat, then sounding an audible warning signal.

3. The method of claim 1, further comprising:
   (viii) determining whether the child seat buckle detector detects the right harness strap attached to the child seat buckle;
   (ix) if the child seat buckle detector does not detect the right harness strap attached to the child seat buckle, then determining whether a child is present in the seat; and
   (x) if a child is determined to be present in the seat, then sounding an audible warning signal.

4. The method of claim 1, further comprising:
   (viii) determining whether the child seat buckle detector detects the left harness strap attached to the child seat buckle;
   (ix) if the child seat buckle detector does not detect the left harness strap attached to the child seat buckle, then determining whether a child is present in the seat; and
   (x) if a child is determined to be present in the seat, then sounding an audible warning signal.

5. The method of claim 1, further comprising:
   (viii) determining whether the vehicle seat belt buckle detector detects the lap/shoulder belt buckle tongue attached to vehicle seat belt buckle;
   (ix) if the vehicle seat belt buckle detector does not detect the lap/shoulder belt buckle tongue attached to vehicle seat belt buckle, then determining whether a child is present in the seat; and
   (x) if a child is determined to be present in the seat, then sounding an audible warning signal.

6. The method of claim 1, further comprising:
   (viii) determining whether the locking clip detector detects the locking clip attached near the vehicle seat belt buckle;
   (ix) if the locking clip detector does not detect the locking clip attached near the vehicle seat belt buckle, then determining whether a child is present in the seat; and
   (x) if a child is determined to be present in the seat, then sounding an audible warning signal.

7. The method of claim 1, further comprising:
   (viii) determining whether the latch anchor detector detects the hook of the tether strap attached to the latch anchor of the vehicle;
   (ix) if the latch anchor detector does not detect the hook of the tether strap attached to the latch anchor of the vehicle, then determining whether a child is present in the seat; and
   (x) if a child is determined to be present in the seat, then sounding an audible warning signal.

8. The method of claim 1, where the back sensor is positioned in the back support, the torso sensor is positioned in the torso support, the right leg sensor is positioned in the right leg support, and the left leg sensor is positioned in the left leg support.

9. The method of claim 8, further comprising:
   a battery configured to be connected to the controller and where the child restraint system is contained within itself and not integrated into a vehicle so that the child restraint system may be placed in any vehicle.

10. A child restraint system configured to be secured to a vehicle having a lap/shoulder belt, a lap/shoulder belt buckle tongue, a vehicle seat belt buckle, and a latch anchor, the child restraint system comprising:
    a base;
    a seat connected to the base, where the seat include includes a torso support connected to a back support, a right leg support, and a left leg support, where the seat further includes a right harness strap and a left harness strap configured to be releasably secured to a child seat buckle and a chest clip, and where the seat further includes a locking clip and a tether strap having a hook;
    a back sensor;
    a torso sensor;

a right leg sensor;
a left leg sensor;
a child seat buckle detector;
a chest clip detector;
a vehicle seat belt buckle detector;
a locking clip detector;
a latch anchor detector;
a speaker; and
a controller configured to be in communication with the back sensor, the torso sensor, the right leg sensor, the left leg sensor, the child seat buckle detector, the chest clip detector, the vehicle seat belt buckle detector, the locking clip detector, the latch anchor detector, and the speaker.

11. The child restraint system of claim 10, where the back sensor is positioned in the back support, the torso sensor is positioned in the torso support, the right leg sensor is positioned in the right leg support, and the left leg sensor is positioned in the left leg support.

12. The child restraint system of claim 11, further comprising:
a battery configured to be connected to the controller and where the child restraint system is contained within itself and not integrated into a vehicle so that the child restraint system may be placed in any vehicle.

* * * * *